US008757190B2

(12) United States Patent
Nielsen (10) Patent No.: US 8,757,190 B2
(45) Date of Patent: Jun. 24, 2014

(54) NOZZLE DESIGN ON MIXPROOF VALVES (75) Inventor: Jesper Bak Nielsen, Kolding (DK)

(73) Assignee: Alfa Laval Corporate AB, Lund (SE)

( * ) Notice: Subject to any disclaimer, the term of this patent is extended or adjusted under 35 U.S.C. 154(b) by 46 days.

(21) Appl. No.: 13/499,536

(22) PCT Filed: Sep. 30, 2010

(86) PCT No.: PCT/DK2010/050246
§ 371 (c)(1),
(2), (4) Date: May 10, 2012

(87) PCT Pub. No.: WO2011/038738
PCT Pub. Date: Apr. 7, 2011

(65) Prior Publication Data
US 2012/0216842 A1 Aug. 30, 2012

(30) Foreign Application Priority Data
Oct. 2, 2009 (DK) .................................. 2009 70139

(51) Int. Cl.
*F16K 1/44* (2006.01)
(52) U.S. Cl.
CPC ...................................... *F16K 1/446* (2013.01)
USPC ... 137/15.06; 137/240; 137/312; 137/614.17; 137/614.18; 134/166 C; 134/166 R; 134/167 R; 134/178; 134/201
(58) Field of Classification Search
USPC ...................... 134/166 C, 166 R, 167 R, 178; 137/15.06, 240, 312, 614.17–614.18, 137/614.19
See application file for complete search history.

(56) References Cited

U.S. PATENT DOCUMENTS

| 4,552,167 | A | * | 11/1985 | Brakelmann | 137/15.06 |
| 5,806,554 | A | * | 9/1998 | Mieth | 137/240 |
| 6,178,986 | B1 | * | 1/2001 | Burmester | 137/240 |
| 6,676,047 | B1 | * | 1/2004 | Lindholm Jensen et al. | 239/596 |

FOREIGN PATENT DOCUMENTS

DE 4203724 A1 8/1993
EP 0090090 A2 10/1983

OTHER PUBLICATIONS

International Search Report for PCT/DK2010/050246 dated Jan. 26, 2011.
Written Opinion for PCT/DK2010/050246 dated Jan. 26, 2011.

* cited by examiner

*Primary Examiner* — Michael Barr
*Assistant Examiner* — Kevin G Lee
(74) *Attorney, Agent, or Firm* — Buchanan Ingersoll & Rooney PC

(57) ABSTRACT

A cleaning system for cleaning one or more valve seats in a valve and for cleaning one or more interior surfaces of said valve with a cleaning agent, where said cleaning system are preferably arranged in a mixproof valve (1) consisting of at least a valve body (2), one or more valve seats (5, 9), a first valve plug (4) with a first stem (6) and a second valve plug (8) with a second stem (10), the second valve plug having a central hollow part (11) for guiding the first stem. Said cleaning system has nozzle means (17) for creating two different spray patterns, said nozzle means being arranged between and/or on the first stem and the hollow central part of the second valve plug, where a first spray pattern is primarily used for cleaning the interior surfaces of said valve and where a second spray pattern is primarily used for cleaning one or more of said valve seats, while the valve is open between a product area (14) and a drain area (15).

18 Claims, 6 Drawing Sheets

NOZZLE DESIGN ON MIXPROOF VALVES

FIELD OF THE INVENTION

The present invention relates to a cleaning system for cleaning one or more valve seats in a valve and for cleaning one or more interior surfaces of said valve with a cleaning agent, where said cleaning system are preferably arranged in a mixproof valve consisting of at least a valve body, one or more valve seats, a first valve plug with a first stem and a second valve plug with a second stem, the second valve plug having a central hollow part for guiding the first stem.

BACKGROUND OF THE INVENTION

In various types of valves, i.e. double seat valves also known as mixproof valves, it is commonly known to clean a valve seat by circulating cleaning liquid through said open valve seat. The cleaning is carried out for hygienic reasons and is normally carried out in an automatic manner with a certain time interval or the like.

The valve can be cleaned with the valve seat fully open but the cleaning is mainly carried out with a partly open valve seat to minimize the amount of used cleaning liquid and at the same time a partly open valve seat also has the advantage that a flow of cleaning liquid is flushed through at the exact place that is to be cleaned. The valve seat to be cleaned can be positioned in-stream or end-stream.

In the known solutions such a cleaning has to be carried out as described above or by a manual cleaning, where the valve parts are cleaned as effectively as possible, leaving some areas in the valve in a somewhat unclean state.

An example of a known solution can be seen in U.S. Pat. No. 4,552,167, which describes a cleaning system for cleaning one or more valve seats with a cleaning agent.

OBJECT OF THE INVENTION

It is therefore the object of the present invention to provide a new and automatic mechanical and quick system for cleaning the interior of a valve and for cleaning valve seats and thus obtain a more hygienic and easier method of cleaning of said valve.

DESCRIPTION OF THE INVENTION

The present invention discloses, as mentioned above, a cleaning system for cleaning one or more valve seats in a valve and for cleaning one or more interior surfaces of said valve with a cleaning agent, where said cleaning system has nozzle means for creating two different spray patterns, said nozzle means being arranged between and/or on the first stem and the hollow central part of the second valve plug, where a first spray pattern is primarily used for cleaning the interior surfaces of said valve and where a second spray pattern is primarily used for cleaning one or more of said valve seats, while the valve is open between a product area and a drain area.

Such a cleaning system is suitable for use in tank valves, where the interior of the valves as well as the valve seats have to be cleaned on a regular basis. By using a system according to the invention, it is possible to make an effective and quick cleaning of the interior surfaces as well as of the valve seats. The first spray pattern is used for cleaning the interior surfaces of the valve. The spray is guided by the nozzle means along the first stem and hits the backside of the first valve plug, from where the flow of cleaning agent is guided along the other surfaces inside the valve. This will be discussed further in the detailed description of the invention and by reference to relevant figures. In a preferred embodiment of the first valve plug, the backside of this is shaped with a concave surface from the first stem and thereby being able to guide the pressurized cleaning agent along its surface and further along the inside surface of the second stem. These details will also be described in the detailed description.

In a preferred embodiment of a cleaning system according to the invention, the nozzle means for the first spray pattern for cleaning the interior surfaces are provided with one or more apertures, preferably with a ring-shaped gap between and along the first stem and the hollow central part of the second valve plug, where said nozzle means are provided with having one or more apertures are connected to a supply of pressurized cleaning agent, and where the direction of the one or more apertures and thus the direction of the first spray pattern are along the first stem and towards the interior backside of the first valve plug. As mentioned, the nozzle means can be configured with one or more apertures and in the most simple state it is configured as a ring-shaped gap leading a film of cleaning agent along the surfaces. By having one or more apertures, a number of jets can be created and lead over the surfaces to be cleaned.

In another preferred embodiment of a cleaning system according to the invention, the nozzle means for the second spray pattern for cleaning one or more of said valve seats are provided with one or more apertures with an angle to the first stem, and preferably are provided with nozzle means with a cone-shaped ring gap, where said nozzle means having one or more apertures are connected to a pressurized supply of cleaning agent, and where the direction of the one or more apertures and thus the direction of the second spray pattern are provided with an angle to the stem and towards the valve seat of the first valve plug and the valve body. This is obtained, as mentioned, by having the one or more apertures provided with an angle to the stem. Thus it is possible to have a pressurized film or jets of cleaning agent directed against the valve seat to be cleaned. The angle of the apertures in the nozzle means are designed to have the desired direction.

As mentioned above, the cleaning system according to the invention has two different spray patterns, which are obtained by changing the relative position between the first valve plug and the second valve plug or vice versa, as parts of the nozzle means in the area of the first stem of the first valve plug and the hollow central part of the second valve plug are either covered for creating the first spray pattern or uncovered by said relative movement for creating the second spray pattern.

Between the first stem and the hollow central part of the second valve plug the nozzle means are located and have a double function as one position of the first stem in relation to the hollow central part of the second valve plug guides the flow of cleaning agent along the first stem and further along the interior surfaces of the valve. Another relative position of the mentioned parts allow a more direct jet of cleaning agent being splashed at and through an opening between the first valve plug and the valve housing, whereby this valve seat is cleaned.

A cleaning system according to the invention can be provided with nozzle means that has one or more apertures arranged evenly around the circumference of the first stem. This can be in the shape of holes or cut-outs in the nozzle means or in the shape of a ring-shaped gap. By having the one or more apertures distributed evenly along the circumference of the first stem or the nozzle means, an evenly cleaning is obtained as the surfaces are exposed to an evenly amount and pressure of cleaning agent.

In another embodiment of the invention, a cleaning system has nozzle means provided with one or more apertures, where the centre line of said one or more apertures are crossing the central axis of the first stem, thus the one or more apertures creates a twist in relation to the central axis of the stem. By using apertures with a direction twisting in relation to the stem, the flow of pressurized cleaning agent also will have this twist, allowing for a longer contact between the cleaning agent and the surfaces to be cleaned. In some applications this will result in a better cleaning.

In order to secure a perfect cleaning system as possible, said nozzle means can further be provided with one or more undercut means at the edge of the aperture in the nozzle means, thus giving a better exit of the pressurized cleaning agent, where these undercut means are active at least when creating the second spray pattern. While creating the second spray pattern, a direct and powerful jet of cleaning agent is preferred and thus it is essential to have the cleaning agent leave the nozzle means as perfect as possible. This is obtained by shaping the area around the aperture or apertures with relatively sharp edges, by making the mentioned undercut close to the opening of the gap. In the detailed description this will be discussed further.

In a preferred embodiment of the invention, said first stem is a part of said nozzle means as the one or more apertures are created between the first stem and another nozzle part. This way a simple and robust solution is created, which is easy to maintain and operate.

Thus a cleaning system according to the invention can have one or more undercut means in the area close to the one or more apertures, thus giving a better exit of the pressurized cleaning agent as also discussed above. These undercut means are active at least when creating the second spray pattern.

The cleaning system according to the invention can also be configured with said nozzle means as a unit with certain characteristics/properties, where said nozzle means are subject to replacement due to wear or other reasons. This embodiment applies to both the situations where the nozzle means incorporate the first stem or where the nozzle means are in a separate unit. By having the nozzle means with certain characteristics/properties, which can be different from purpose to purpose, it is easy to change the nozzle means and thus the spray pattern, its capacity, direction or pressure, simply by changing the nozzle means or a part of the nozzle means as a unit.

By using the system according to the invention, a very fast and reliable cleaning of the surfaces and the valve seat is obtained and at the same time the demand for a hygienic solution is accomplished.

DESCRIPTION OF THE DRAWING

The invention will now be explained with reference to the accompanying drawing wherein.

DETAILED DESCRIPTION OF THE INVENTION

Figure 1:
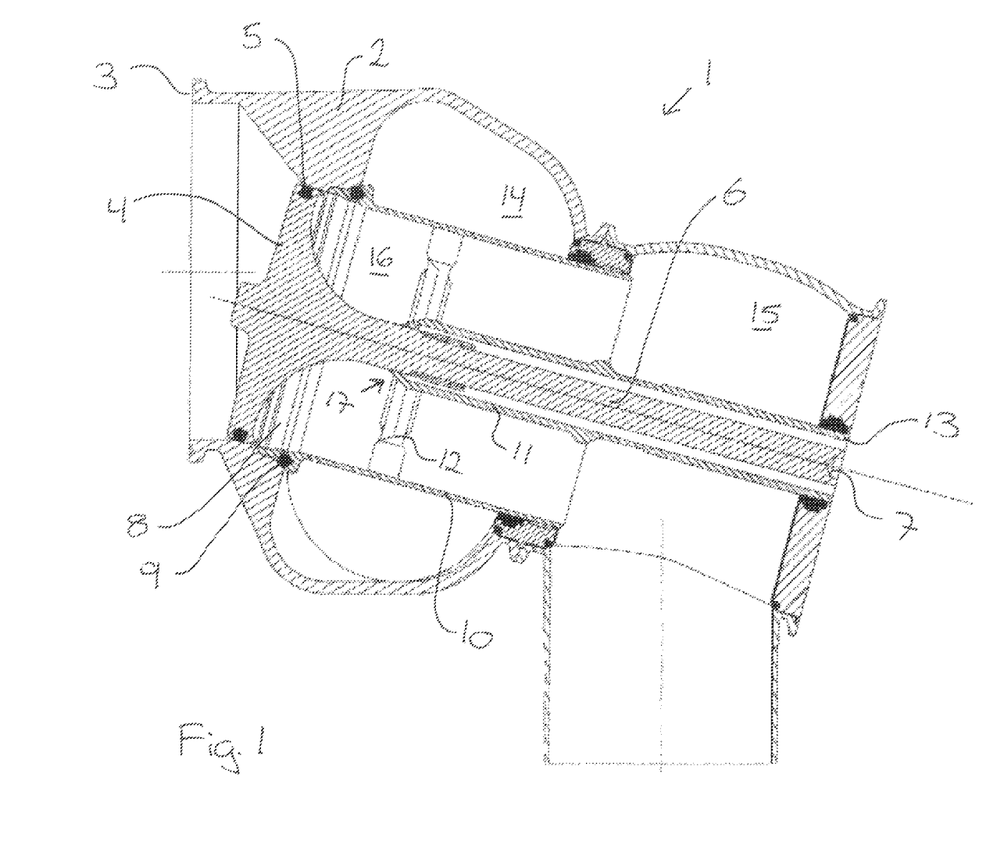
FIG. 1 illustrates a double seat tank valve.

In FIG. 1 a double seat tank valve 1 is shown. In the following, this is referred to as the valve 1. The valve 1 consists of a valve body 2 provided with a flange 3 for fitting to a not shown corresponding flange on a tank. The valve 1 further has a first valve plug 4, a first valve seat 5, and a first valve stem 6. The first valve stem 6 is connected to a actuator (not shown) at the end 7 of said first valve stem 6. The valve also consists of a second valve plug 8, a second valve seat 9, a second valve stem 10 and of a hollow central part 11. The hollow central part 11 is rigidly connected to the second valve stem 10 via a number of struts 12 and at the end 13 the hollow central part 11 is also connected to a actuator (not shown). In the valve body 2, there is a product area 14 and a drain area 15. By activating the first valve plug 4 into the tank, a media in the tank can be lead to the drain area 15. Likewise, it is possible to lead a media from the product area 14 to the drain area 15 by having the first valve plug 4 closed in the first valve seat 5, while the second valve plug 8 is activated to open the second valve seat 9.

According to the invention, a pressurized supply of cleaning agent is fed through the hollow central part 11 entering the interior 16 of the valve 1. Between the first valve stem 6 and the hollow central part 11 nozzle means 17 are arranged.

In the following figures, these nozzle means will be discussed in further details, and will be illustrated by enlarged cut-outs where only some parts of the valve 1 are shown.

Figure 2:
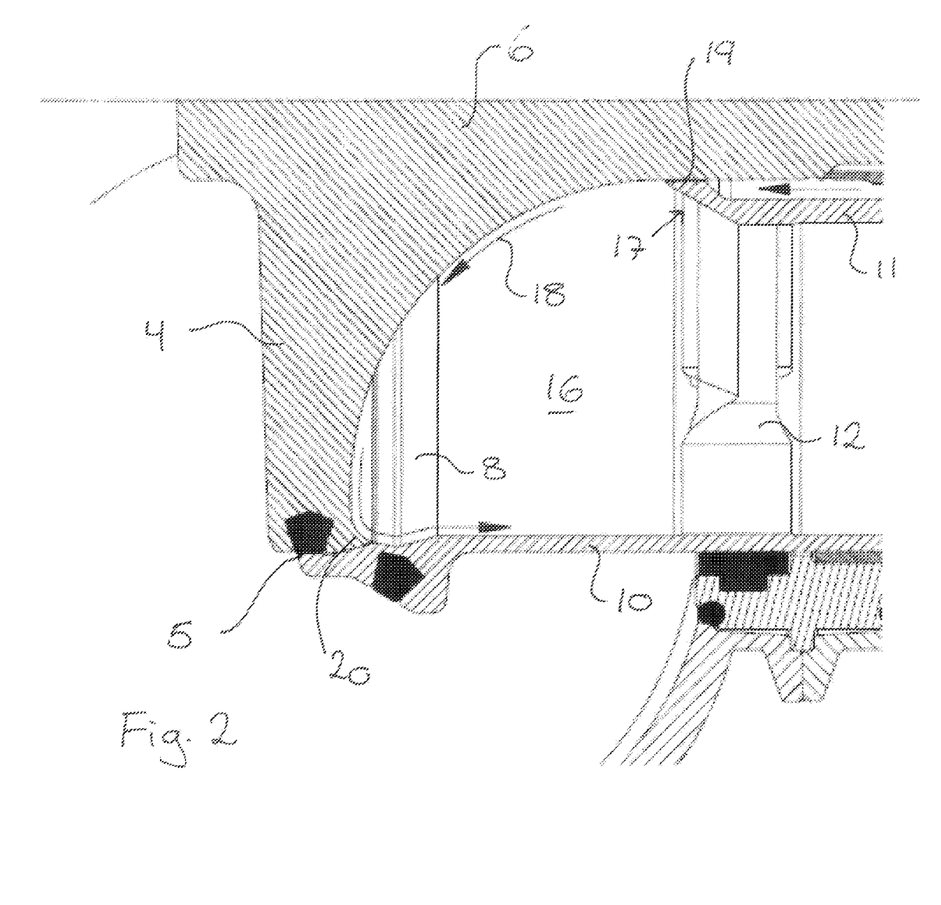
FIG. 2 illustrates parts of the valve plugs in a first relative position, with arrows indicating the flow of cleaning agent.

In FIG. 2, a cut-out of the valve 1 is shown. Cleaning agent illustrated by arrows 18 is flushed through the ring-shaped gap 19 between the first valve stem 6 and the nozzle means 17 at the end of the hollow central part 11. As the nozzle means in this relative position of the first valve plug 4 and the second valve plug 8 creates a gap 19 shaped as a cylinder wall, the cleaning agent 18 is jetted along the first valve stem 6 and is by the concave shape of the backside of the first valve plug 4 lead to all the interior 16 of the first 4 and second 8 valve plugs. In FIG. 2, it can also be seen that the flow of cleaning agent 18 is never pointed directly against a valve seat as the first valve plug 4 has a small curvature 20 leading the cleaning agent away from the valve seat 5.

Figure 3:
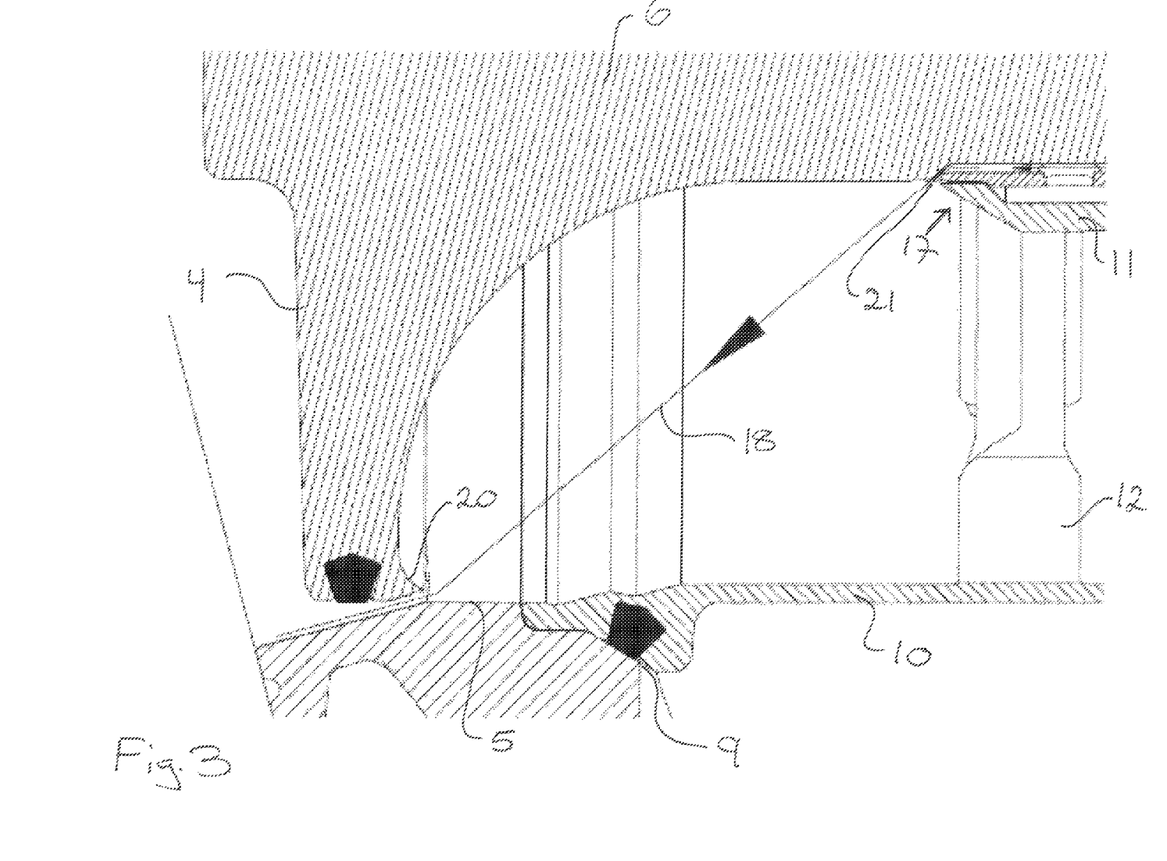
FIG. 3 illustrates the same parts as in FIG. 2 but with the parts of the valve plugs in a second relative position.

In FIG. 3, the valve 1 is shown with the first valve plug 4 and the second valve plug 8 in another relative position, where the first valve plug 4 is lifted from the valve seat 5. By moving the first valve plug 4 to this position the nozzle means 17 are also moved relative to each other, now directing the flow of cleaning agent 18 directly against the open valve seat 5 and thus cleaning the valve seat 5. By the relative movement between the first valve plug 4 and the second valve plug 8 the nozzle means 17 as mentioned is also moved relative to each other, whereby the previous gap 19 shaped as a cylinder wall is blocked and a new cone-shaped gab 21 is opened.

Figure 4:
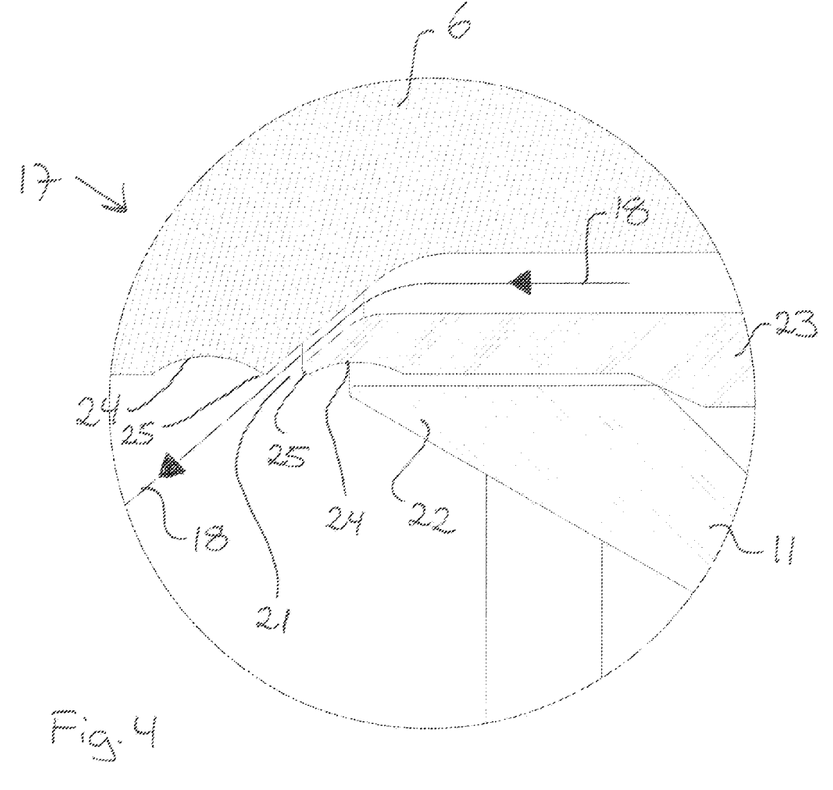
FIG. 4 illustrates details of nozzle means as in FIG. 3.

In FIG. 4, the nozzle means 17 is shown in an even larger enlargement. The cone-shaped gap 21 directs the flow of cleaning agent 18 in the same direction as the gap 21, and this direction is designed to the specific valve 1, and is meant to have a direction against the valve seat 5 as shown in FIG. 3. In this figure, the nozzle means 17 consists of the first valve stem 6, the front part 22 of the hollow central part 11 and a nozzle unit 23 arranged on the first valve stem 6. At the edge of the nozzle means 17, more precisely on the first valve stem 6 and on the nozzle unit 23 there are provided undercut means 24. These undercut means can be a groove around the first valve stem 6 or around the nozzle unit 23 or the undercut means 24 can be a row of dimples. Regardless of the appearance of the undercut means, the function is to secure that the flow of cleaning agent leaves the nozzle means in a powerful manner, which is best obtained by having a kind of orifice 21 with a narrow edge 25.

Figure 5:
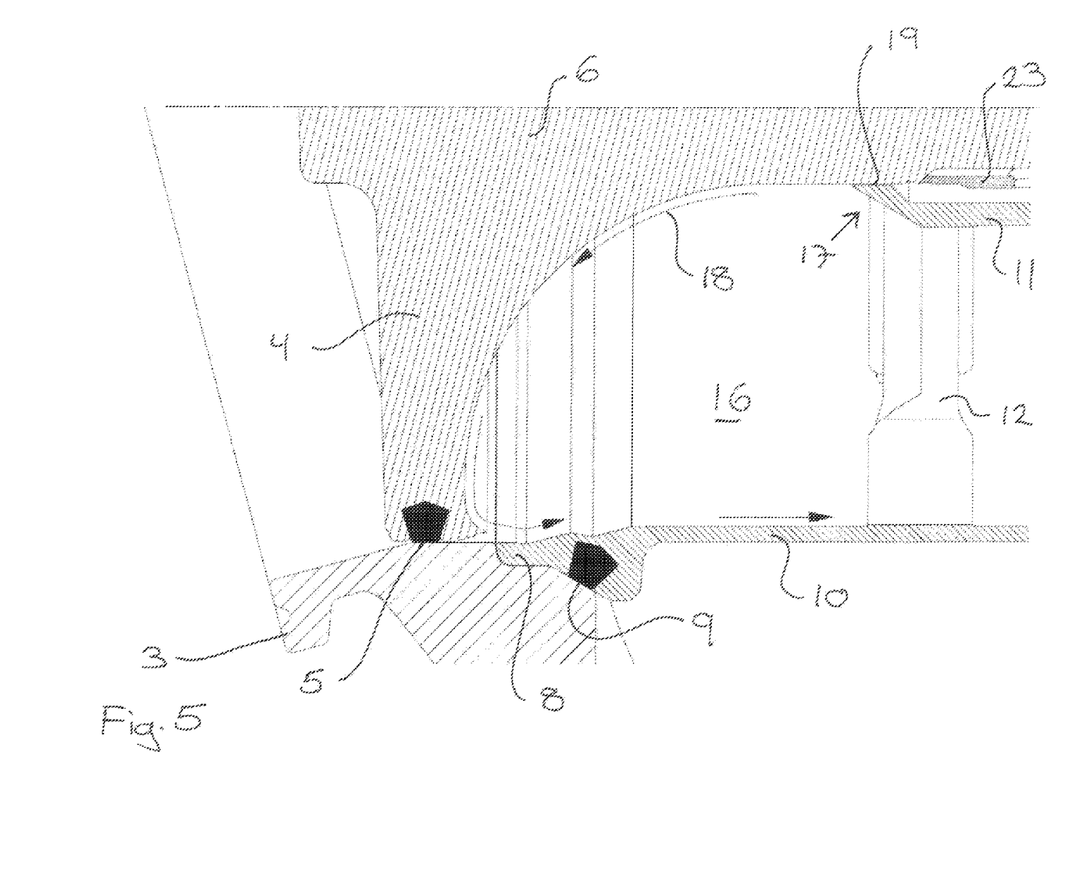
FIG. 5 illustrates the same part as in FIGS. 2 and 3 but with the parts of the valve plugs in a third relative position.

In FIG. 5, the second valve seat 9 is closed and cleaning agent 18 is flushed along the first valve stem 6 and cleaning the interior of the valve parts.

Figure 6:
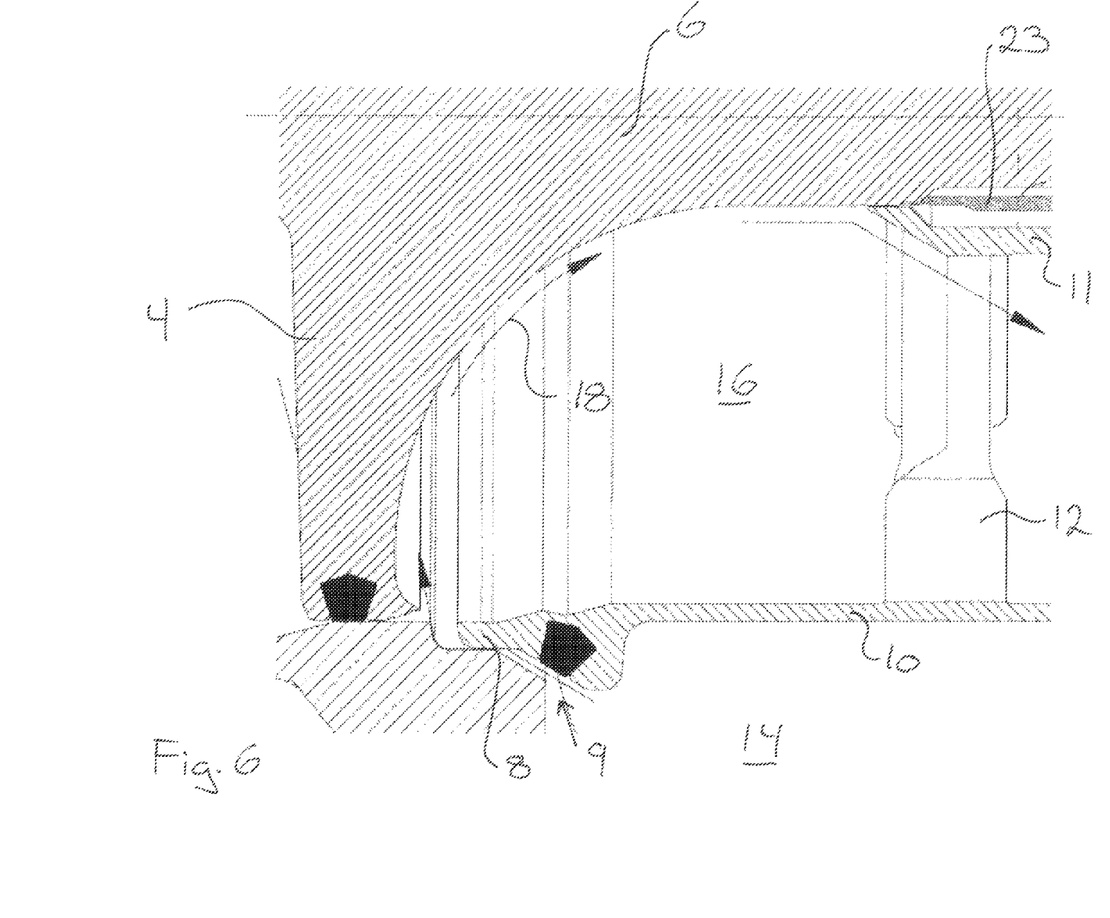
FIG. 6 illustrates cleaning of the valve with the valve parts in a fourth relative position.

In FIG. 6, the valve 1 is in the same position as in FIG. 5, but now the cleaning agent 18 is flushed through the valve seat 9 from the product area 14 and thus cleaning the interior of the valve part with a flow of cleaning agent 18 in the opposite direction as if the nozzle means 17 were used.

The invention is not limited to the embodiments described above and shown on the drawings, but can be supplemented and modified in any manner within the scope of the invention as defined by the enclosed claims.

LIST OF POSITION NUMBERS 1 valve
2 valve body
3 flange
4 first valve plug
5 first valve seat
6 first valve stem
7 end of first valve stem
8 second valve plug
9 second valve seat
10 second valve stem
11 hollow central part
12 struts
13 end of hollow central part
14 product area
15 drain area
16 interior of valve parts
17 nozzle means
18 flow of cleaning agent
19 ring shaped gap
20 curvature on first valve plug
21 cone-shaped gap
22 front part of the hollow central part
23 nozzle unit
24 undercut means
26 narrow edge

The invention claimed is:

1. A cleaning system for cleaning one or more valve seats in a valve and for cleaning one or more interior surfaces of said valve with a cleaning agent, where said cleaning system is arranged in a valve consisting of at least a valve body, one or more valve seats, a first valve plug with a first stem and a second valve plug with a second stem, the second valve plug having a central hollow part for guiding the first stem, said cleaning system has nozzle means for creating two different spray patterns, said nozzle means being arranged between and/or on the first stem and the hollow central part of the second valve plug, where a first spray pattern primarily is used for cleaning the interior surfaces of said valve and where a second spray pattern primarily is used for cleaning one or more of said valve seats, while the valve is open between a product area and a drain area, the nozzle means for the second spray pattern for cleaning one or more of said valve seats are provided with one or more apertures with an angle to the first stem, where said nozzle means provided with one or more apertures are connected to a pressurized supply of cleaning agent, and where the direction of the one or more apertures and thus the direction of the second spray pattern are provided with an angle to the first stem and towards the valve seat of the first valve plug and the valve body.

2. The cleaning system according to claim 1, wherein the nozzle means for the first spray pattern for cleaning the interior surfaces are provided with one or more apertures, with a ring-shaped gap between and along the first stem and the hollow central part of the second valve plug, where said nozzle means provided with the one or more apertures are connected to a supply of pressurized cleaning agent, and where the direction of the one or more apertures and thus the direction of the first spray pattern are along the first stem and towards the interior backside of the first valve plug.

3. The cleaning system according to claim 1, wherein the two different spray patterns are obtained by changing the relative position between the first valve plug and the second valve plug or vice versa, as parts of the nozzle means in the area of the first stem of the first valve plug and the hollow central part of the second valve plug are either covered for creating the first spray pattern or uncovered by said relative movement for creating the second spray pattern.

4. The cleaning system according to claim 1, wherein said nozzle means have one or more apertures arranged evenly around the circumference of the first stem.

5. The cleaning system according to claim 1, wherein said nozzle means have one or more apertures, and the centre line of said one or more apertures are crossing the central axis of the first stem, thus the one or more apertures creates a twist in relation to the central axis of the stem.

6. The cleaning system according to claim 1, wherein said nozzle means further is provided with one or more undercut means at the edge of the one or more apertures in the nozzle means, thus giving a better exit of the pressurized cleaning agent, and where these undercut means are active at least when creating the second spray pattern.

7. The cleaning system according to claim 1, wherein said first stem is a part of said nozzle means.

8. The cleaning system according to claim 1, wherein said first stem is provided with one or more undercut means in an area close to the one or more apertures, thus giving a better exit of the pressurized cleaning agent, where these undercut means are active at least when creating the second spray pattern.

9. The cleaning system according to claim 1, wherein said nozzle means are a unit and are replaceable.

10. A cleaning system for cleaning one or more valve seats in a valve and for cleaning one or more interior surfaces of said valve with a cleaning agent, where said cleaning system is arranged in a mixproof valve consisting of at least a valve body, one or more valve seats, a first valve plug with a first stem and a second valve plug with a second stem, the second valve plug having a central hollow part for guiding the first stem, said cleaning system has nozzle means for creating two different spray patterns, said nozzle means being arranged between and/or on the first stem and the hollow central part of the second valve plug, where a first spray pattern primarily is used for cleaning the interior surfaces of said valve and where a second spray pattern primarily is used for cleaning one or more of said valve seats, while the valve is open between a product area and a drain area, the nozzle means for the second spray pattern for cleaning one or more of said valve seats are provided with one or more apertures with an angle to the first stem, and are provided with nozzle means with a cone-shaped ring gap, where said nozzle means provided with one or more apertures are connected to a pressurized supply of cleaning agent, and where the direction of the one or more apertures and thus the direction of the second spray pattern are provided with an angle to the first stem and towards the valve seat of the first valve plug and the valve body.

11. The cleaning system according to claim 10, wherein the nozzle means for the first spray pattern for cleaning the interior surfaces are provided with one or more apertures, with a ring-shaped gap between and along the first stem and the hollow central part of the second valve plug, where said nozzle means provided with the one or more apertures are connected to a supply of pressurized cleaning agent, and where the direction of the one or more apertures and thus the direction of the first spray pattern are along the first stem and towards the interior backside of the first valve plug.

12. The cleaning system according to claim 10, wherein the two different spray patterns are obtained by changing the relative position between the first valve plug and the second valve plug or vice versa, as parts of the nozzle means in the area of the first stem of the first valve plug and the hollow central part of the second valve plug are either covered for creating the first spray pattern or uncovered by said relative movement for creating the second spray pattern.

13. The cleaning system according to claim 10, wherein said nozzle means have one or more apertures arranged evenly around the circumference of the first stem.

14. The cleaning system according to claim 10, wherein said nozzle means have one or more apertures, and the centre line of said one or more apertures are crossing the central axis of the first stem, thus the one or more apertures creates a twist in relation to the central axis of the stem.

15. The cleaning system according to claim 10, wherein said nozzle means further is provided with one or more undercut means at the edge of the one or more apertures in the nozzle means, thus giving a better exit of the pressurized cleaning agent, and where these undercut means are active at least when creating the second spray pattern.

16. The cleaning system according to claim 10, wherein said first stem is a part of said nozzle means.

17. The cleaning system according to claim 10, wherein said first stem is provided with one or more undercut means in an area close to the one or more apertures, thus giving a better exit of the pressurized cleaning agent, where these undercut means are active at least when creating the second spray pattern.

18. The cleaning system according to claim 10, wherein said nozzle means are a unit and are replaceable.

* * * * *